United States Patent
Lee et al.

(10) Patent No.: US 9,218,069 B2
(45) Date of Patent: Dec. 22, 2015

(54) OPTICAL SENSING DEVICE TO SENSE DISPLACEMENT

(71) Applicant: Avago Technologies General IP (Singapore) Pte.Ltd., Singapore (SG)

(72) Inventors: Sai Mun Lee, Penang (MY); Kevin Len-Li Lim, Perak (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 182 days.

(21) Appl. No.: 13/861,245

(22) Filed: Apr. 11, 2013

(65) Prior Publication Data

US 2014/0306894 A1    Oct. 16, 2014

(51) Int. Cl.
   *G06F 3/0354*    (2013.01)

(52) U.S. Cl.
   CPC .................... *G06F 3/03543* (2013.01)

(58) Field of Classification Search
   None
   See application file for complete search history.

(56) References Cited

U.S. PATENT DOCUMENTS

| | | |
|---|---|---|
| 7,161,582 B2 | 1/2007 | Bathiche et al. |
| 7,511,804 B1 * | 3/2009 | Olczak .................... 356/139.03 |
| 7,737,948 B2 | 6/2010 | Spurlock et al. |
| 7,872,639 B2 | 1/2011 | Theytaz et al. |
| 2003/0058445 A1 * | 3/2003 | Fritz et al. ..................... 356/399 |
| 2006/0170662 A1 * | 8/2006 | Kurane ......................... 345/204 |
| 2009/0135140 A1 * | 5/2009 | Constantin et al. ........... 345/166 |
| 2011/0108713 A1 | 5/2011 | Momtahan et al. |
| 2013/0106786 A1 * | 5/2013 | Yang et al. .................... 345/175 |

FOREIGN PATENT DOCUMENTS

EP    2017702    1/2009

* cited by examiner

*Primary Examiner* — Luke Ratcliffe
*Assistant Examiner* — Samantha K Abraham

(57) ABSTRACT

An optical sensing device to measure displacement in a parallel direction perpendicular to a proximate surface is disclosed. The optical sensing device may comprise a tracking light source, a displacement light source, a displacement optical element, and a sensor. The tracking light source may generate a first beam spot on the proximate surface and the displacement light source may generate a second beam spot. The second beam spot may be smaller than the first beam spot. The displacement light source may be optically coupled with the displacement optical element to generate the second beam spot at an incident angle α that may generate a shift in the second beam spot position when the optical sensing device is displaced relative to the proximate surface. The shift in the second beam spot position to a new position may correspond to a displacement of the optical sensing device in a direction perpendicular to the proximate surface.

18 Claims, 18 Drawing Sheets

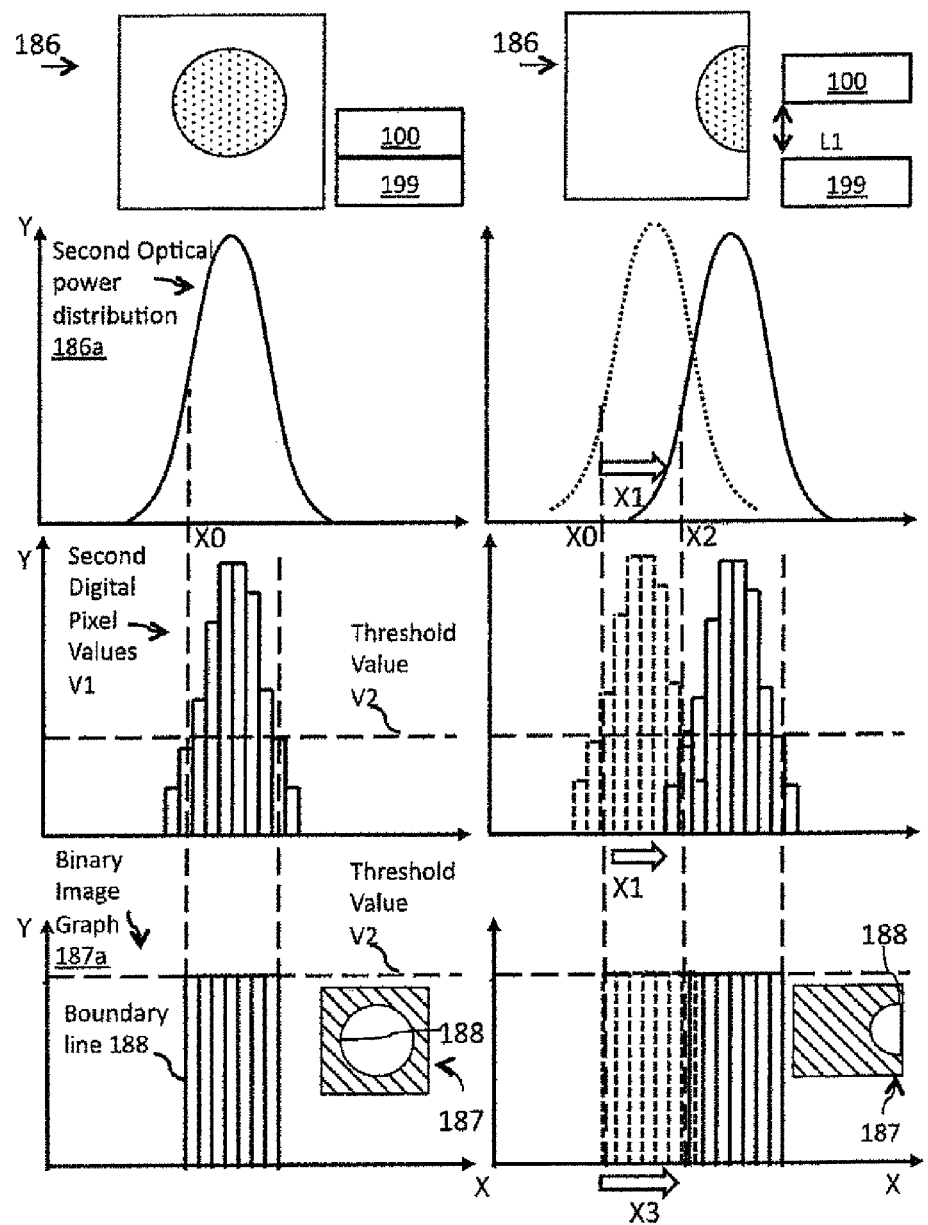

| Displacement in a direction perpendicular to the proximate surface (L1) | Binary Image 287 |
|---|---|
| 0.0mm |  |
| 0.5mm |  |
| 0.8mm |  |

| Displacement in a direction perpendicular to the proximate surface | Normalized Optical Power |
|---|---|
| 0.0mm | 1.00 |
| 0.5mm | 0.5 |
| 0.8mm | 0.14 |
| 0.9mm | 0.09 |
| 1.0mm | 0.06 |
| Overturned | 0.00 |

FIG. 4B

Electronic hand
held device
601

605 Casing

600 Optical sensing device

OPTICAL SENSING DEVICE TO SENSE DISPLACEMENT

BACKGROUND

Mobile input devices play an important role in enhancing user's experience in using electronic devices. For example, an optical mouse senses a user's hand movement and enables the user to navigate programs in a computer system or other electronic devices. An accurate detection of the users hand movement enables the optical mouse to convey the right information from the user to the computer system.

Another example is a proximity sensing device. A proximity sensing device is commonly used in electronic devices to perform certain functionalities in response to the presence of an external object. An accurate detection of the external object may involve determining a displacement distance between the external object and the sensor. By measuring the displacement distance accurately, the optical sensing device may enable the electronic devices to activate or deactivate certain functionalities. For example, when the proximity sensing device is used in a touch screen enabled mobile phones, the proximity sensing device is used to detect when the mobile phone is moved closer to the user's ear so that the mobile phone may disable its touch screen functionality.

While mobile input devices provide many advantages, some challenges may remain. For example, additional configurations may be desired, so as to provide additional desired functionality.

BRIEF DESCRIPTION OF THE DRAWINGS

Illustrative embodiments by way of examples, not by way of limitation, are illustrated in the drawings. Throughout the description and drawings, similar reference numbers may be, but not necessarily, used to identify similar elements. The drawings are for illustrative purpose to assist understanding and may not be drawn per actual scale.

FIG. 1E shows graphs of the second optical power distribution representative of the second image, the second digital pixel values and the binary image as generated by the optical sensing device;

FIG. 1F shows graphs of the second optical power distribution representative of the second image, the second digital pixel values and the binary image generated by the optical sensing device when the optical sensing device is displaced relative to the proximate surface;

FIG. 4B shows a table on the displacement values generated by an optical sensing device by using the method shown in FIG. 4A;

DETAILED DESCRIPTION

Figure 1A:
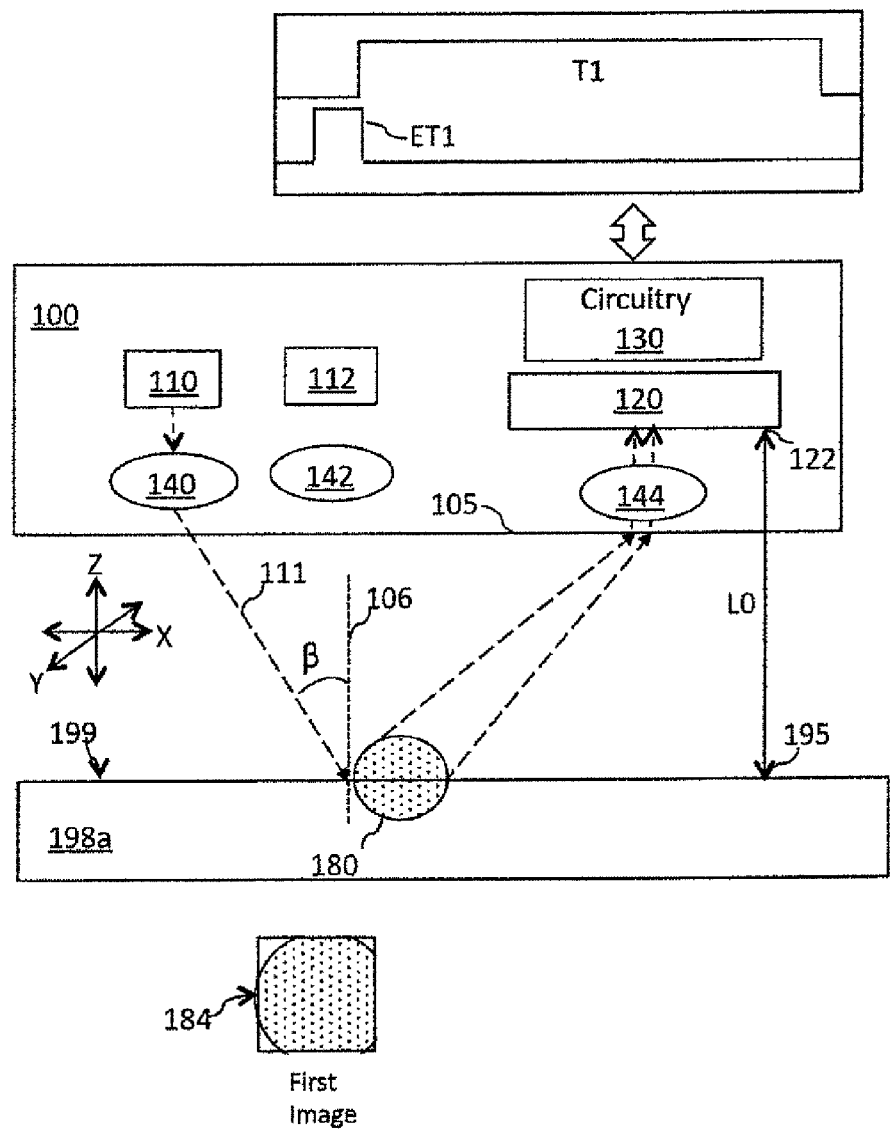
FIG. 1A illustrates a block diagram and a timing chart of an optical sensing device when a tracking light source generates a first beam spot on a proximate surface.

Referring to FIGS. 1A-1J, the optical sensing device 100 may comprise a tracking light source 110, a tracking optical element 140, a displacement light source 112, a displacement optical element 142, a sensor 120, a sensing optical element 144, and a circuitry 130.

FIG. 1A illustrates a block diagram and a timing chart of an optical sensing device 100 when a tracking light source 110 generates a first beam spot 180 on a proximate surface 199. In the embodiment shown in FIG. 1A, the tracking light source 110 and the displacement light source 112 may be a light emitting diode or a laser. The tracking light source 110 may be configured to generate a first beam spot 180 on the proximate surface 199 at the initial height L0. The initial height L0 may be measured from a first reference point 122 located on the sensor 120 to a second reference point 195 on the proximate surface 199 when there is an initial or "zero" displacement L1 (shown in FIG. 1C). The displacement L1 may refer to a displacement of the optical sensing device 100 in a perpendicular direction to the proximate surface 199. In one embodiment, the first reference point 122 may be located on a position on the sensor 120 which is substantially parallel to the proximate surface 199. In another embodiment, the first reference point 122 may be located on other similar positions on the sensor 120 that captures the first beam spot 180.

In one embodiment, the second reference point 195 may be located on a position on the proximate surface 199 that is substantially parallel to the sensor 120. In another embodiment, the second reference point 195 may be located on other parts of the proximate surface 199 that reflects the light from a light source such as the tracking light source 110. The proximate surface 199 may be a surface in proximity to the optical sensing device 100. The proximate surface 199 may be any type of surface and may be made from one or more types of material compositions such as wood, plastic laminate desktops, or any other similar type of surface where the optical sensing device 100 may be used. The proximate surface 199 may be a portion of a table or a desk or other similar objects 198a. In one embodiment, the initial height L0 may refer to a height when the lowest portion 105 of the optical sensing device 100 may be substantially in direct contact with the proximate surface 199. In another embodiment, the initial height L0 may be a height where the optical sensing device 100 is resting on the proximate surface 199.

The tracking light source 110 may be optically coupled with the tracking optical element 140 to generate the first beam spot 180 on a proximate surface 199 with a tracking incident angle β. The tracking incident angle β may be an angle between a normal line 106 and a tracking light beam 111 generated by the tracking light source 110. The normal line 106 may be a line perpendicular to the proximate surface 199 at the point where the tracking light beam 111 may be reflected.

The sensor 120 may be configured to capture a first image 184 of the proximate surface 199 when the first beam spot 180 is generated. The sensor 120 may be an image sensor or a pixel array of photo sensors or other types of photo detectors. The sensor 120 may be optically coupled with the sensing optical element 144 to direct the reflected lights of the tracking light beam 111 from the proximate surface 199 to the sensor 120.

The sensor 120 may be configured to capture the first image 184 of the proximate surface 199 within a first exposure time ET1. After which, the circuitry 130 may be configured to track the optical sensing device 100 movements in a parallel direction relative to the proximate surface 199 by analyzing the first image 184 within a first time frame T1. The parallel direction relative to the proximate surface 199 may be substantially along the X axis or Y axis or both X and Y axes.

Figure 1B:
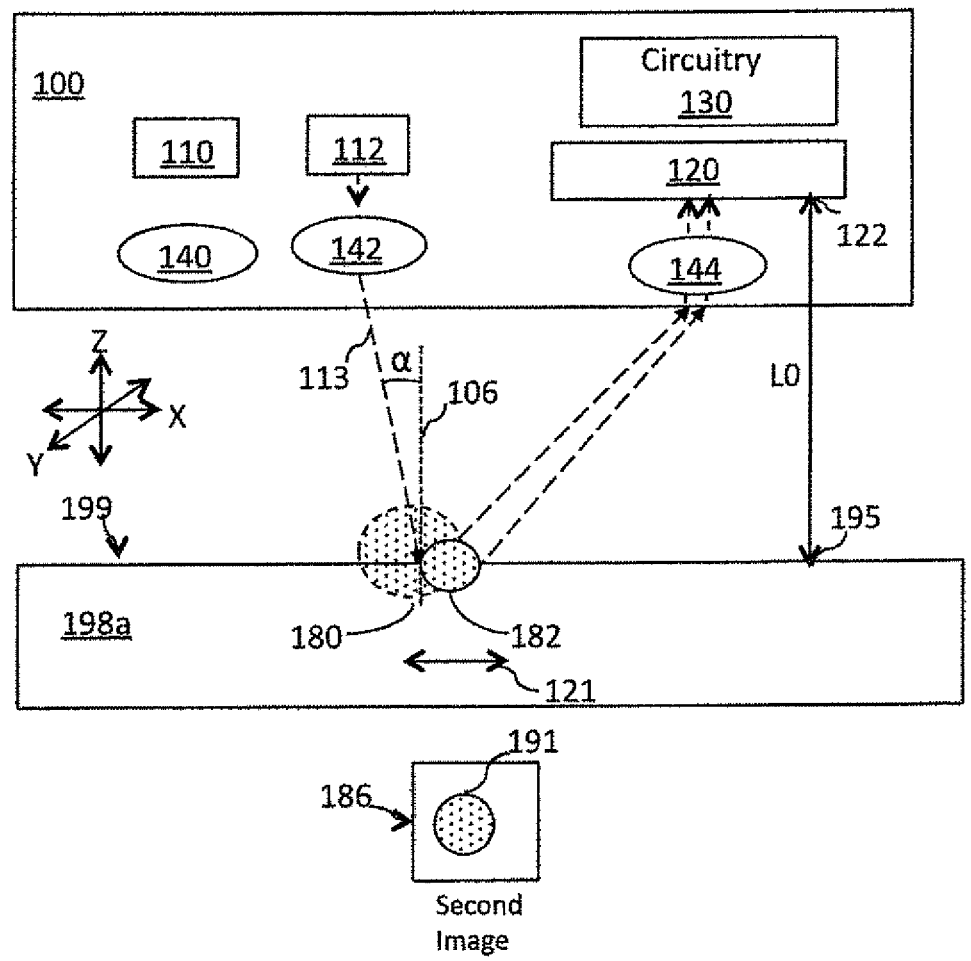
FIG. 1B illustrates a block diagram of an optical sensing device when a displacement light source generates a second beam spot on a proximate surface.

FIG. 1B illustrates a block diagram of an optical sensing device 100 when a displacement light source 112 generates a second beam spot 182 on a proximate surface 199. The displacement light source 112 may be configured to generate a second beam spot 182 on the proximate surface 199 at an incident angle α. The incident angle α may be defined as an angle between a normal line 106 and the displacement light beam 113 generated by the displacement light source 112. The normal line 106 may be a line perpendicular to the proximate surface 199 at the point where the displacement light beam 113 may be reflected.

The second beam spot's 182 location on the proximate surface 199 may overlap with the location of the first beam spot 180. The sensor 120 may be configured to capture a second image 186 of the proximate surface 199 when the second beam spot 182 is generated.

The sensor 120 may have a predetermined field of view 121. The displacement optical element 142 may be optically coupled with the displacement light source 112. The displacement optical element 142 may be configured to position the second beam spot 182 wholly within the field of view 121 of the sensor 120. By positioning the second beam spot 182 wholly within the field of view 121 of the sensor 120, the second image 186 may show a substantially circular shape 191 representative of the second beam spot 182 when the optical sensing device is at the initial height L0. In one embodiment, the shape 191 in the second image 186 may be substantially circular but in another embodiment, the shape may be oval or any other shape that may represent the second beam spot 182.

Figure 1C:
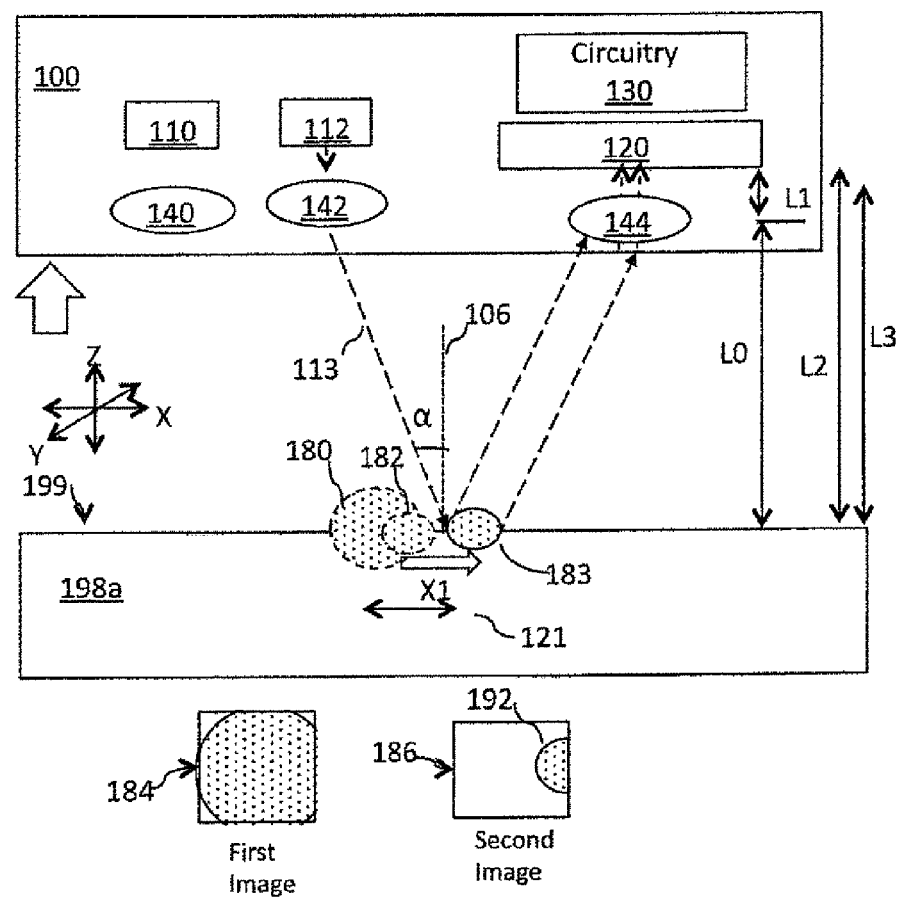
FIG. 1C illustrates a block diagram of an optical sensing device when the optical sensing device is displaced relative to a proximate surface.

Referring to FIG. 1C, a block diagram of an optical sensing device 100 when the optical sensing device 100 is displaced relative to the proximate surface 199 is shown. The displacement light source 112 may be optically coupled with the displacement optical element 142 to generate the second beam spot 182 at an incident angle α. By directing the second beam spot 182 at an incident angle α, the displacement optical element 142 may generate a shift X1 in the second beam spot 182 position when the optical sensing device 100 is displaced relative to the proximate surface 199. The shift X1 in the second beam spot 182 position to a new position 183 may correspond to a displacement L1 of the optical sensing device 100 in a direction perpendicular to the proximate surface 199.

When the optical sensing device 100 is displaced relative to the proximate surface 199, the optical sensing device 100 may move from the initial height L0 to a displacement height L2. The displacement height L2 may be measured from the same reference points with the initial height L0. The L2 may be equal to the initial height L0 plus the displacement L1. The circuitry 130 may be configured to sense the shift X1 in the second beam spot 182 position and to generate a displacement value L1 corresponding to the displacement of the optical sensing device 100 in the direction perpendicular to the proximate surface 199.

When the optical sensing device 100 is displaced relative to the proximate surface 199, the displacement optical element 142 may be configured to position the second beam spot 182 at least partially outside the field of view 121 of the sensor 120. Consequently, the second image 186 may show a substantially semi circular shape 192 representative of a portion of the second beam spot 182. In one embodiment, the shape 192 in the second image 186 may be substantially semi circular but in another embodiment, the shape may be half oval or any other shape that may represent the second beam spot 182. The change in shape of the second image 186 from the circular shape 191 to the semi circular shape 192 may provide a unique feature that can be utilized to correlate the second image 186 to the displacement L1. For example, the shape change may indicate that there is a shift in the boundary line 188 (shown in FIG. 1E) of the second image 186, and the circuitry may analyze the shift in the boundary line 188 to determine the displacement value L1.

The presence of the displacement light source 112 may enable an alternate activation arrangement between the tracking and displacement light sources 110, 112. For example, the displacement light source 112 may be activated after the tracking light source 110 is deactivated. The alternate activation between the tracking and displacement light sources 110, 112 may enable the sensor 120 to capture the first image and second images 184, 186 at different time. The first image and second images 184, 186 may then be easily distinguishable and the circuitry 130 may readily analyze the characteristics of the first and second images 184, 186 with minimal distortion. The analysis of the second image 186 with minimal distortion by the circuitry 130 may enable the optical sensing device 100 to generate an accurate displacement value L1 without compensating the tracking accuracy in a parallel direction of the proximate surface 199.

The circuitry 130 may be configured to determine an operational height limit L3 of the optical sensing device 100. The operational height limit L3 may correspond to an approximate maximum distance above the proximate surface 199 where there may be substantial degradation of an ability of the circuitry 130 to track the movement of the optical sensing device 100 in a direction parallel to the proximate surface 199. In one embodiment, the circuitry 130 may utilize the operational height limit L3 to prevent the optical sensing device 100 from providing false tracking information to a user of the optical sensing device 100, for example by deactivating the tracking light source 110 above the operational height limit L3. The deactivation of the tracking light source 110 may also reduce power consumption of the optical sensing device 100.

In one embodiment, the sensor 120 may be a two dimensional pixel array of photo sensors. When a beam spot is captured by the sensor as an image, the optical power captured by individual pixel may be represented as a pixel value. A typical pixel value may range from 0 to 255. The zero pixel value may represent low optical power and may appear as black color pixel in the image. At the other end, when the pixel value is 255, it may represent high optical power and may appear as white color pixel in the image.

Figure 1D:
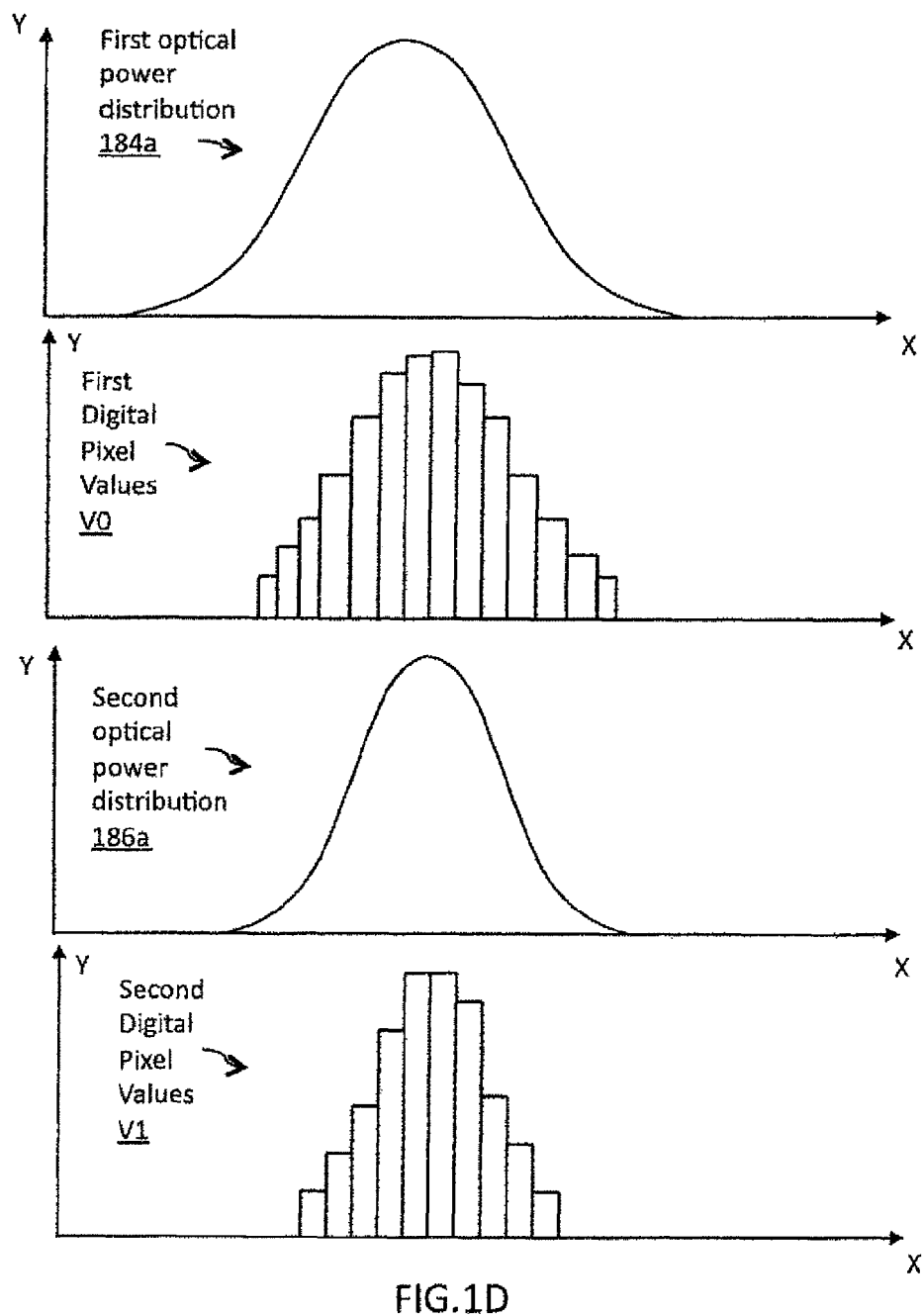
FIG. 1D shows graphs of first and second optical power distributions representative of the first and second images and their digital pixel value representations as generated by the optical sensing device.

Referring now to FIGS. 1D-1F, the Y axis may correspond to the pixel values and the X axis may correspond to an average position of all the pixels in the same column of the pixel array of the sensor 120. An optical power distribution may refer to the distribution of the optical power and the corresponding pixel values along the X axis.

FIG. 1D shows graphs of the first and second optical power distributions 184a, 186a representative of the first and second images 184, 186. When the first image 184 is captured by the sensor 120, the optical power distribution of the first beam spot 180 may be represented as the first optical power distribution 184a. When the second image 186 is captured by the sensor 120, the optical power distribution of the second beam spot 182 may be represented as the second optical power distribution 186a. In one embodiment, the second beam spot 182 may have high optical power in the center and low optical power around the circumference. Correspondingly, the second optical power distribution 186a, representative of the second image 186, may show high pixel values in the center of the graph and low pixel values at the tail ends of the graph.

FIG. 1E shows the graphs of the second optical power distribution 186a representative of the second image 186, the second digital pixel values V1 and the binary image 187 generated by the optical sensing device 100. The circuitry 130 may be configured to determine a threshold value V2 from the first exposure time ET1 (shown in FIG. 1A).

The circuitry 130 may be configured to use threshold value V2 to convert the second image 186 into a binary image 187 with the following method. The circuitry 130 may be configured to convert the second image 186 to the second digital pixel values V1. When the second digital pixel value V1 of the second image 186 is less than the threshold value V2, the circuitry 130 may convert the second digital pixel value V1 to 0. When the second digital pixel value V1 is greater than the threshold value V2, the circuitry 130 may convert the second digital pixel value V1 to 1. In another embodiment, the second digital pixel value V1 may be converted to 1 if the second digital pixel value V1 is less than the threshold value V2, and may be converted to 0 if the second digital pixel value V1 is greater than the threshold value V2. By converting the second digital pixel value V1 to either 1 or 0, the circuitry 130 may convert the second image 186 to the binary image 187. The binary image graph 187a shows a graphical representation of the binary image 187 to illustrate the pixel values in the binary image 187 may be equal to either 1 or 0. After the conversion to binary image 187, the circuitry 130 may be configured to determine a boundary line 188 within the binary image 187. The boundary line 188 may be the line that separates the area where pixel values equal to 1 and the area where pixel values equal to 0.

FIG. 1F shows the graphs of the second optical power distribution 186a representative of the second image 186, the second digital pixel values V1 and the binary image 187 generated by the optical sensing device 100 when the optical sensing device 100 is displaced relative to the proximate surface 199. When the optical sensing device 100 is displaced relative to the proximate surface 199, the second optical power distribution 186a may shift. The shift X1 of the second optical power distribution 186a may be from a first position X0 to a second position X2. The shift X1 of the second optical power distribution 186a may correspond to the shift X1 in the second beam spot 182 position as shown earlier in FIG. 1C. The shift X1 in the second optical power distribution 186a may correspond to the shift X3 in the boundary line 188 position in the binary image 187. The circuitry 130 may be configured to generate the displacement value L1 based on the shift X3 in the boundary line 188 position. Since the boundary line 188 has smaller data size compared to the entire binary image 187, the tracking of the boundary line 188 may be done at a faster processing time compared to the tracking of the entire binary image 187.

Figure 1G:
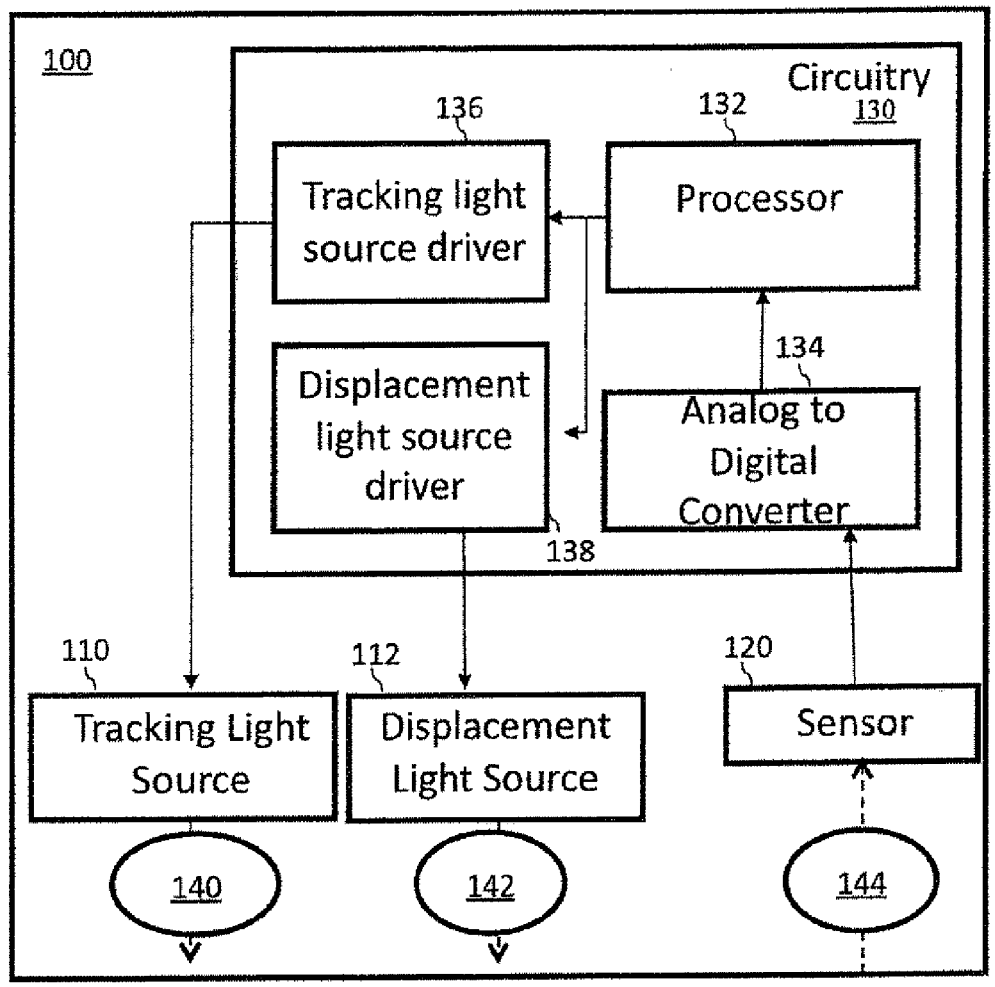
FIG. 1G illustrates a block diagram of circuitry in the optical sensing device.
Figure 1H:
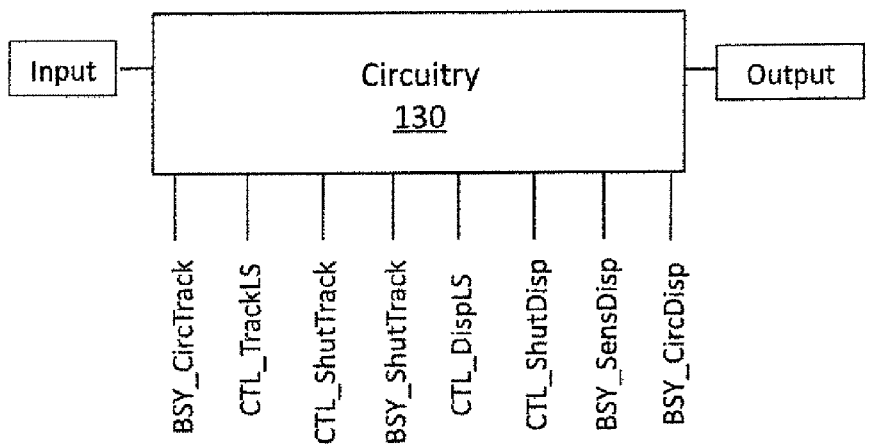
FIG. 1H illustrates a diagram of the signals in circuitry of the optical sensing device.

FIG. 1G illustrates a block diagram of a circuitry 130 in the optical sensing device 100. FIG. 1H illustrates a diagram of the signals in the circuitry 130 and FIG. 1I illustrates a timing chart of the signals in the circuitry 130.

Figure 1I:
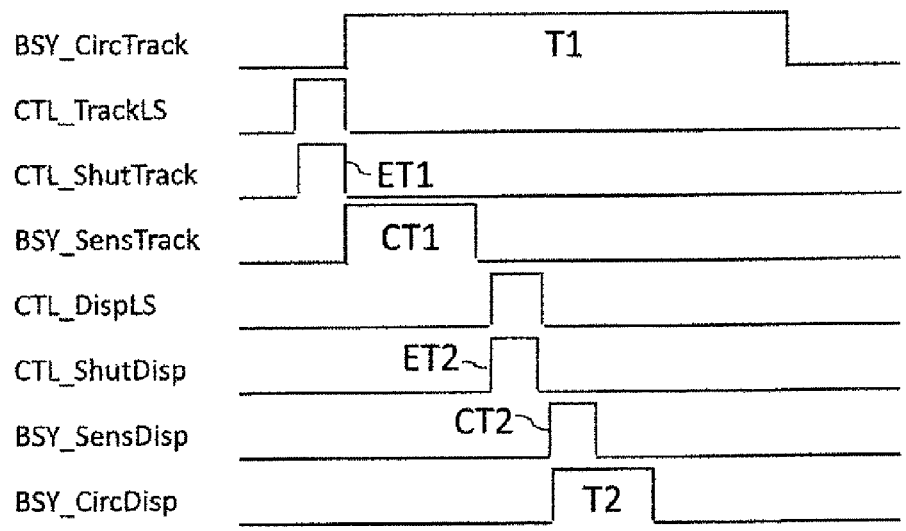
FIG. 1I illustrates a timing chart of circuitry in the optical sensing device.
Figure 1J:
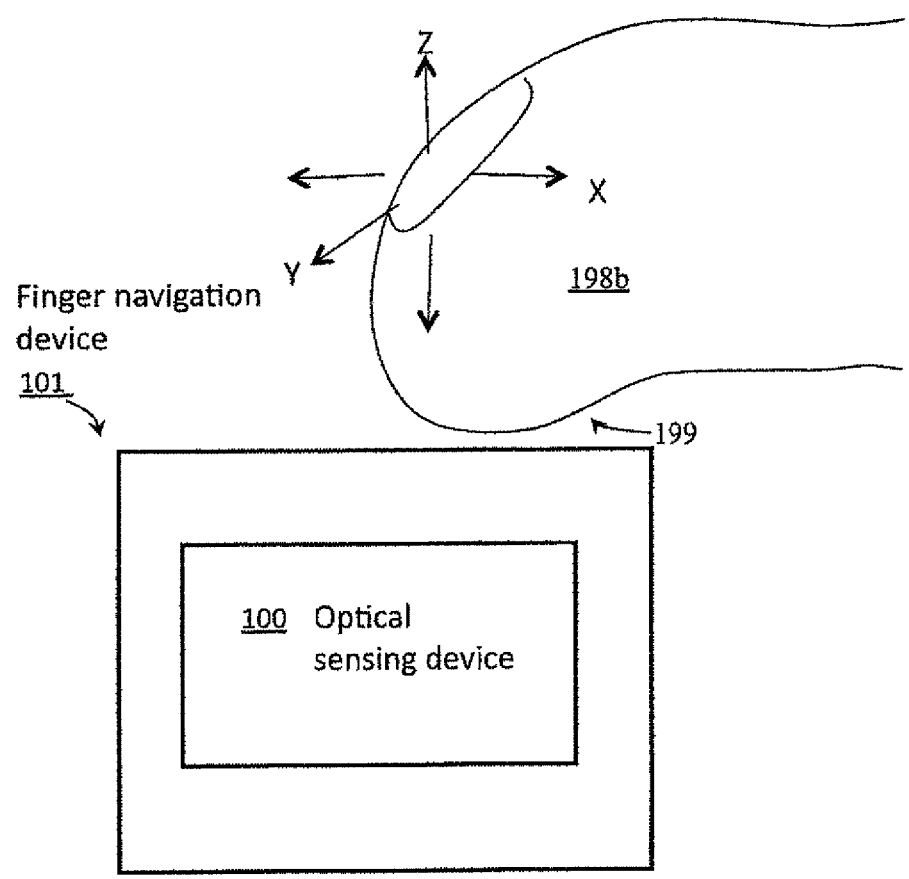
FIG. 1J illustrates a block diagram of an optical sensing device that is a portion of a finger navigation device.

Referring to FIGS. 1G-1I, the circuitry 130 may comprise a tracking light source driver 136, a displacement light source driver 138, an analog to digital converter 134, and a processor 132. In one embodiment, the circuitry 130 may comprise a single light source driver (not shown) to control the tracking and the displacement light sources 110, 112.

Referring now to FIG. 1I, the X axis may correspond to the time and the Y axis may correspond to the state where the circuitry 130 signals are activated. The tracking light source driver 136 may generate the tracking light control signal CTL_TrackLS to activate the tracking light source 110 to generate the first beam spot 180. When the tracking light control signal CTL_TrackLS is activated, the circuitry 130 may generate the tracking shutter control signal CTL_ShutTrack to activate the sensor 120 to capture the first image 184 within the first exposure time ET1. The circuitry 130 may then generate the tracking process signal BSY_CircTrack to analyze the first image 184 within the first time frame T1. As part of the analysis of the first image 184, the analog to digital converter 134 may generate the tracking sensor process signal BSY_SensTrack to convert the first image 184 to the first digital pixel values V0 within the first conversion time CT1.

After the tracking light control signal CTL_TrackLS and the tracking sensor process signal BSY_SensTrack are deactivated, the displacement fight source driver 138 may generate the displacement control signal CTL_DispLS to activate the displacement light source 112 to generate the second beam spat 182. The second beam spot 182 may be generated while the circuitry 130 is analyzing the first image 184 within the first time frame T1. By generating the second beam spot 182 while the first image 184 is analyzed, the circuitry 130 may continuously monitor the movement of the optical sensing device 100 in the parallel direction while generating the displacement value L1.

When the displacement light control signal CTL_DispLS is activated, the circuitry 130 may generate the displacement shutter control signal CTL_ShutDisp to activate the sensor 120 to capture the second image 186 within the second exposure time ET2. The first and second exposure time ET1, ET2 are parts of the first time frame T1. In one embodiment, the second exposure time ET2 may be equal to the first exposure time ET1. In another embodiment, the circuitry 130 may be configured to determine the second exposure time ET2 by generating a first time value corresponding to the first exposure time ET1. The circuitry 130 may be configured to utilize the first time value to determine the second exposure time ET2 such that the sensor 120 pixels are not saturated when capturing the second image 186. In one embodiment, by determining the second exposure time ET2 that does not saturate the sensor 120, the circuitry 130 may correlate the sum of the second digital pixel values 186 with the total power of the light reflected from the displacement light beam 113. The total power of the light reflected from the displacement light beam 113 may change when there is a displacement L1. By monitoring the change in the total power, the circuitry 130 may determine the displacement value L1.

After the displacement shutter control signal CTL_Shut-Disp and the displacement light control signal CTL_DispLS are deactivated, the analog to digital converter 134 may generate the displacement sensor process signal BSY_SensDisp to convert the second image 186 to the second digital pixel values V1 within the second conversion time CT2. The first and second conversion time CT1, CT2 may form a portion of the first time frame T1. The analog to digital converter 134 may generate the displacement process signal BSY_CircDisp to analyze the second digital pixel values V1 to generate the displacement value L1 within the displacement processing time T2.

The displacement light source 112 may be configured to generate the second beam spot 182 that is relatively smaller than the first beam spot 180. The smaller size of the second beam spot 182 may result in a shorter second conversion time CT2 relative to the first conversion time CT1. In one embodiment, the analog to digital converter 134 may be configured to convert the second image 186 at a shorter time duration, such that the second conversion time CT2 may be at least approximately 60% less than the first conversion time CT1. The smaller size of the second beam spot 182 may also result in a short displacement processing time T2. The short second conversion time CT2 and displacement processing time T2 may enable the circuitry 130 to analyze the second image 186 without compensating the time needed by the circuitry 130 to analyze the first image 184. For example, in an embodiment where the optical sensing device 100 is an optical mouse, the short second conversion time CT2 and displacement processing time T2 may enable the optical mouse 100 to sense the displacement L1 in the vertical direction while simultaneously tracking the users hand movement in the parallel direction relative to the optical mouse 100.

In one embodiment, the first beam spot 180 generated by the tracking light source 110 may be approximately at least 60% larger than the second beam spot 182. The first beam spot 182 may be approximately 1.5 times larger than the field of view 121 of the sensor 120. By having the second beam spot 182 that is 60% smaller than the first beam spot 180, the second beam spot 182 size may be around 0.9 times than the field of view 121 of the sensor 120 and may enable the sensor 120 to capture the entire second beam spot 182 within the field of view 121. The circuit 130 may then readily identify the boundary line 188 of the second image 186 at the initial height L0. Once the circuit 130 identifies the boundary line 188 at the initial height L0, the circuit may then proceed to determine the shift in the boundary line 188 when there is a displacement L1.

When the second beam spot 182 is only 30% smaller than the first beam spot 180, the second beam spot 182 may be larger than the field of view 121 of the sensor 120 and the boundary line 188 of the second image 186 may not be readily identified at the initial height L0. When the boundary line 188 is not identified at the initial height L0, the circuitry 130 may not have a reference point to determine whether there is a shift X1 in the boundary line 188. As a result, the circuitry 130 may only get the reference point when the displacement L1 already happens and leads to a delay in generating the displacement value L1.

The circuitry 130 may comprise a processor 132. The processor 132 may be a controller, a microcontroller, a digital signal processor or any other type of processors that is capable of processing the information from the analog to digital converter 134. The processor 132 may be coupled with the analog to digital converter 134. The processor 132 may be configured to analyze the second digital pixel values V1 to determine the displacement value L1 within a displacement processing time T2. The displacement processing time T2 may form a portion of the first time frame T1. The processor 132 may be configured to analyze the first and second digital pixel values V0, V1 concurrently. The process shown in FIG. 1I may be repeated continuously while the optical sensing device 100 is in operation. The processor 132 may be configured to analyze the second digital pixel values V1 at the initial height L0 at the displacement processing time T2 and in the subsequent T2, the processor 132 may be configured to analyze the second digital pixel values V1 at the displacement L1.

The circuitry 130 may generate the displacement value L1 when the optical sensing device 100 is displaced relative to the proximate surface 199. In another embodiment, the displacement value L1 may be generated when the proximate surface 199 is displaced relative to the optical sensing device 100. For example, referring to FIG. 1J, the optical sensing device 100 may be a portion of a finger navigation device 101. The proximate surface 199 may be part of a human body such as a finger 198b. The finger navigation device 101 may be used to provide an input interface for a user to navigate an electronic device (not shown) by using the user's finger 198b. The electronic device (not shown) may be a portable music player, remote control, or other devices that use the user's finger 198b for navigation purpose.

In another embodiment, the optical sensing device 100 may be a portion of an optical encoder. The proximate surface 199 may be a surface of a code wheel 198b and the optical sensing device 100 may be configured to detect the wobbling of the code wheel 198b.

Figure 2A:
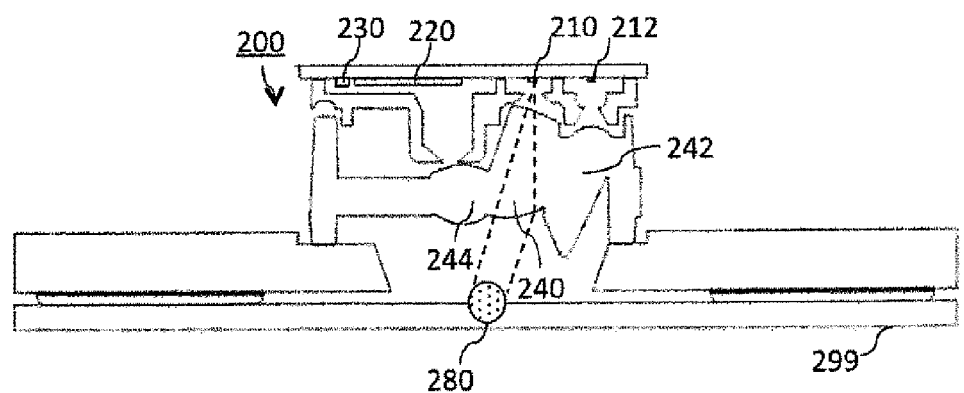
FIG. 2A illustrates a cross sectional view of an optical sensing device with the first beam spot.
Figure 2B:
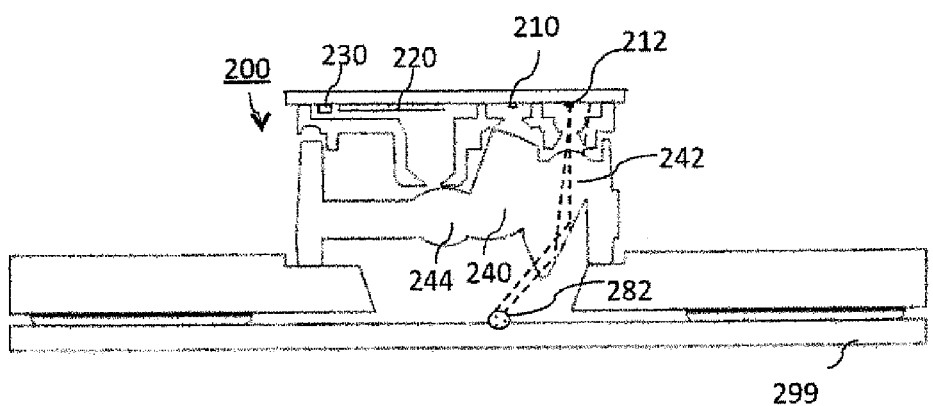
FIG. 2B illustrates a cross sectional view of the optical sensing device with the second beam spot.

Referring to FIGS. 2A-2B, the optical sensing device 200 may be an optical mouse or other similar optical navigation devices capable of communicating an input from a user to a computer system. The optical sensing device 200 may comprise a tracking light source 210, a tracking optical element 240, a displacement light source 212, a displacement optical element 242, a sensor 220, a sensing optical element 244, and a circuitry 230. The embodiment of the optical sensing device 200 may be substantially similar to the embodiment shown in FIG. 1 but may differs in the following points. First, the tracking light source 210 and the displacement light source 212 may be mounted on a different substrate. Second, the tracking light source 210 may be positioned higher or lower than the displacement light source 212.

Referring to FIG. 2A, the tracking light source 210 may be configured to generate a first beam spot 280 on the proximate surface 299 for navigation purposes. Referring to FIG. 2B, the displacement light source 212 may be configured to generate the second beam spot 282 for sensing the displacement L1 (shown in FIG. 2C).

Figure 2C:
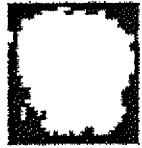
FIG. 2C shows a table on the displacement values generated by an optical sensing device shown in FIGS. 2A-2B.
Figure 2C:
Figure 2C:

FIG. 2C shows a result of the displacement values L1 generated by an embodiment of the optical sensing device 200. The binary image 287 may show a substantially circular shape of white color area when there is an initial or "zero" displacement L1 in the direction perpendicular to the proximate surface 199. In one embodiment, the shape may resemble an oval or elliptical.

When the optical sensing device 200 is displaced relative to the proximate surface 299, the optical sensing device 200 may generate the displacement value L1 of 0.5 mm and the binary image 287 may show a substantially semi circular shape. The boundary line 288 may also shift towards the bottom of the binary image 287. When the optical sensing device 200 is displaced further, the boundary line 288 of the optical sensing device 200 may shift further and the optical sensing device 200 may generate a displacement value L1 of 0.8 mm.

Figure 3:
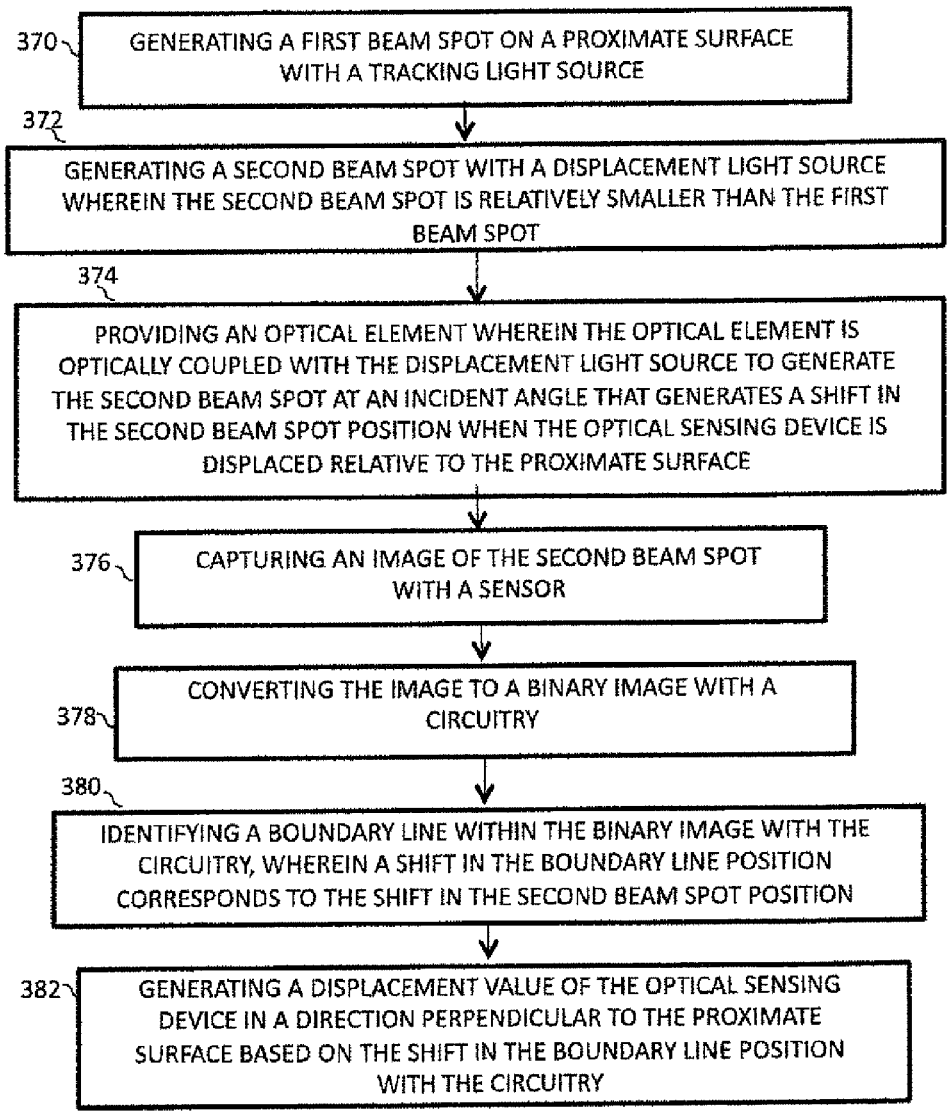
FIG. 3 illustrates a flowchart in using an optical sensing device for measuring displacement by detecting the position of a boundary line.

FIG. 3 shows a flowchart of a method for detecting displacement with an embodiment of an optical sensing device 100 shown in FIGS. 1A-1J. In step 370, a tracking light source 110 may generate a first beam spot 180 on the proximate surface 199. The sensor 120 may capture a first image 184 of the proximate surface 199 when the first beam spot 180 is generated. In step 372, a displacement light source 112 may generate a second beam spot 182. The second beam spot 182 may be relatively smaller than the first beam spot 180.

In step 374, a displacement optical element 142 may be optically coupled with the displacement light source 112 to generate the second beam spot 182 at an incident angle α that may generate a shift X1 in the second beam spot 182 position when the optical sensing device 100 is displaced relative to the proximate surface 199. In Step 376, the sensor 120 may capture a second image 186 of the second beam spot 182.

In step 378, a circuitry 130 may convert the second image 186 to a binary image 187. In step 380 the circuitry 130 may identify a boundary line 188 within the binary image 187. The shift X3 in the boundary line 188 position may correspond to the shift X1 in the second beam spot 182 position.

In step 382, the circuitry 130 may generate a displacement value L1 of the optical sensing device 100 in a direction perpendicular to the proximate surface 199 based on the shift X3 in the boundary line 188 position.

Figure 4A:
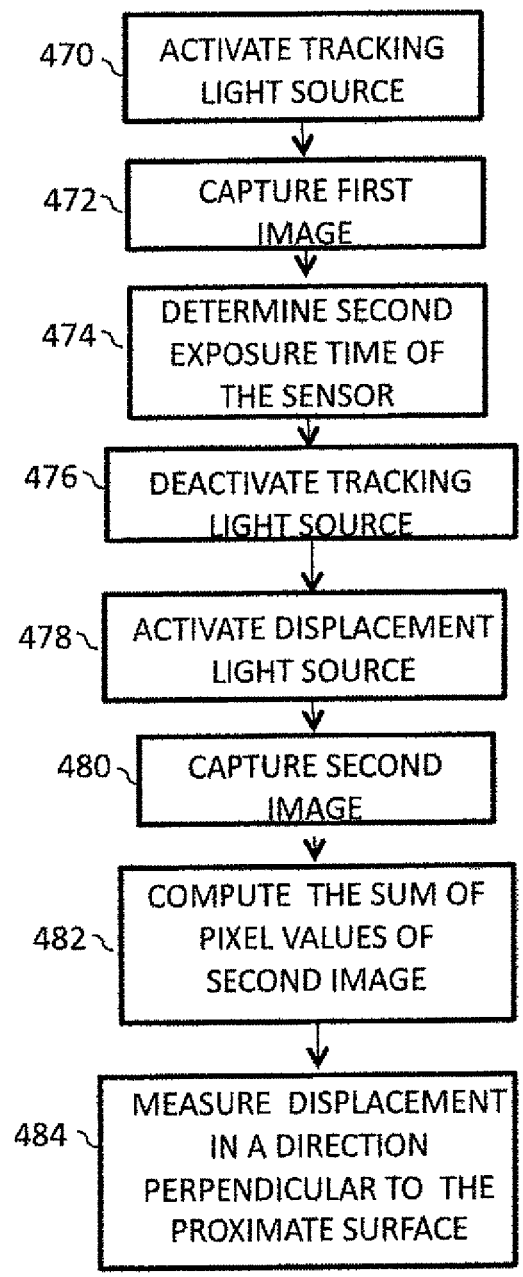
FIG. 4A illustrates a flowchart in using the optical sensing device for measuring displacement by computing the brightness values of the second image.

FIG. 4A shows a flow chart of a method to measure displacement with one of the embodiment of the optical sensing device 100 by computing the sum of second digital pixel values V1 of the sensor 120. In step 470, the tracking light source 110 may be activated to generate the first beam spot 180. In step 472, the sensor 120 may capture the first image 184 of the proximate surface 199 when the first beam spot 180 is generated within a first exposure time ET1. In step 474, the circuitry 130 may determine a second exposure time ET2 of the sensor 120 by analyzing the first exposure time ET1. In step 476, the tracking light source 110 may be deactivated.

In step 478, the displacement light source 112 may be activated to generate the second beam spot 182. In step 480, the sensor 120 may capture the second image 186 within the second exposure time ET2. The second exposure time ET2 may be determined to enable the sensor 120 to capture the second image 186 without saturating the sensor 120. In step 482, the circuitry 130 may compute the sum of the second digital pixel values V1 of the second image 186. In step 484, the circuitry 130 may measure displacement L1 in the direction perpendicular to the proximate surface 199 based on the sum of the second digital pixel values V1.

FIG. 4B shows a result of the displacement values L1 generated by the optical sensing device 100 with the method shown in FIG. 4A. In one embodiment, the normalized optical power may correspond to the sum of the second digital pixel values V1 of the sensor 120. When there is an initial or "zero" displacement L1 in the direction perpendicular to the proximate surface 199, the normalized optical power may be equal to 1.00. When the optical sensing device 100 is displaced relative to the proximate surface 199, the normalized optical power may be equal to 0.5 and the displacement value L1 is equal to 0.5 mm. As the optical sensing device 100 is displaced further from the proximate surface 199, the normalized optical power may decrease and the displacement value L1 may increase. The optical sensing device 100 may be in an overturned state when the normalized optical power is equal to 0.

Figure 5A:
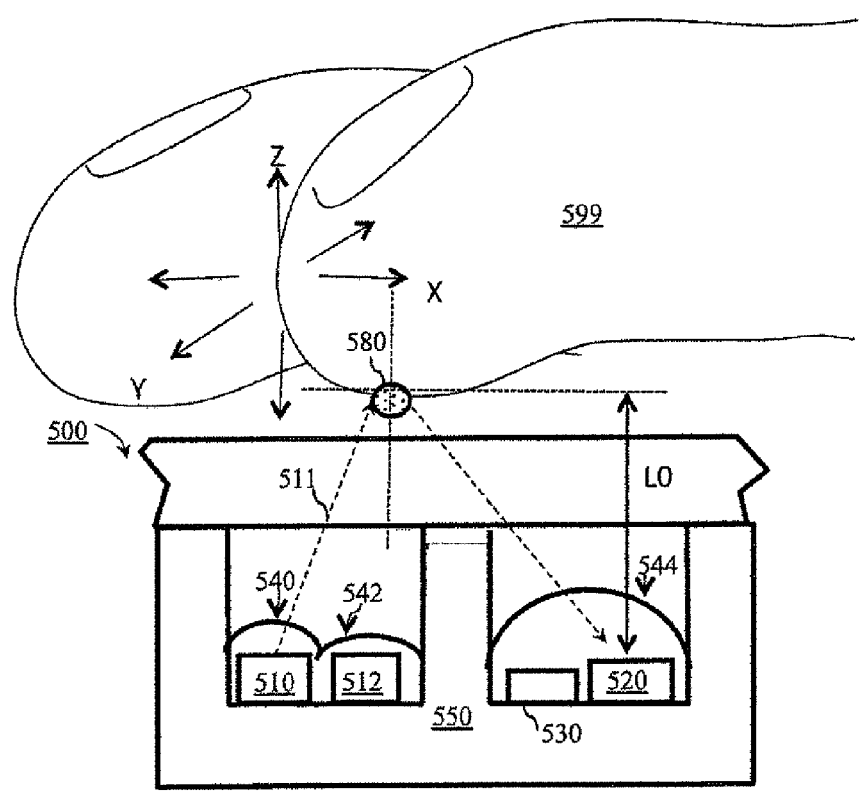
FIG. 5A illustrates a cross sectional view of an optical sensing device when a detection light source generates a first beam spot on an external object.
Figure 5B:
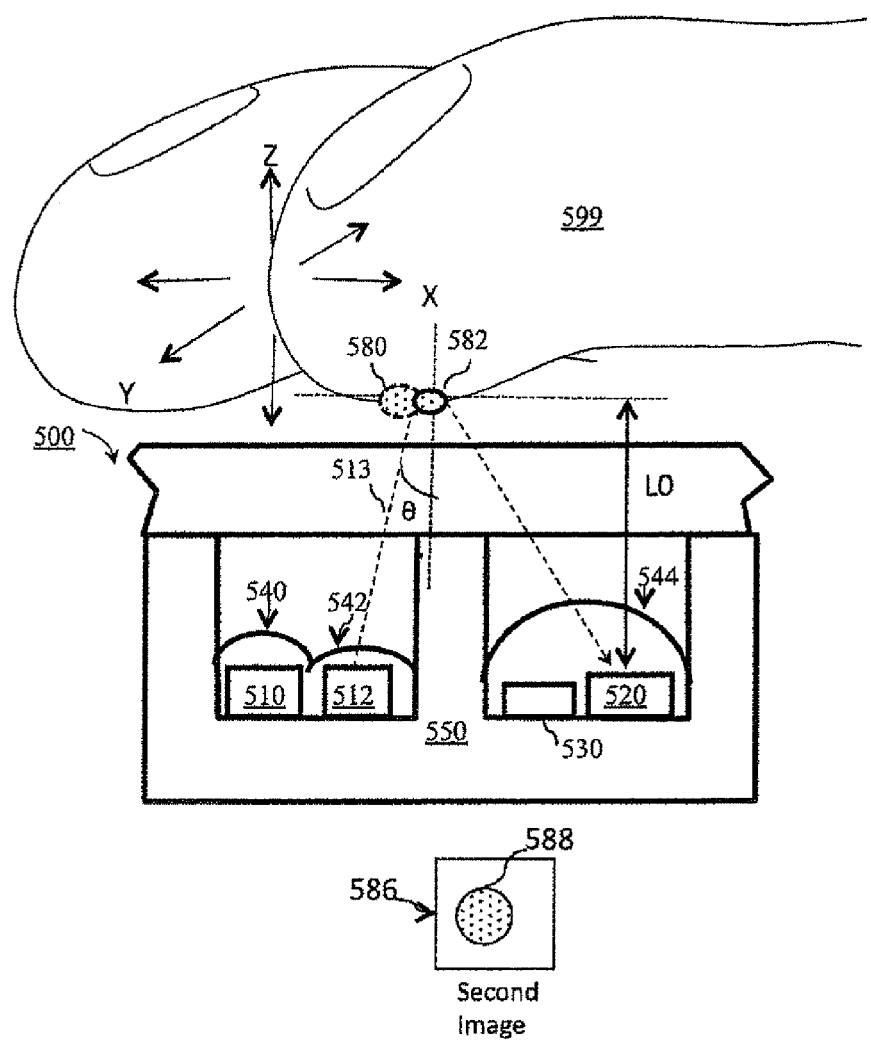
FIG. 5B illustrates a cross sectional view of an optical sensing device when a displacement light source generates a second beam spot on an external object.
Figure 5C:
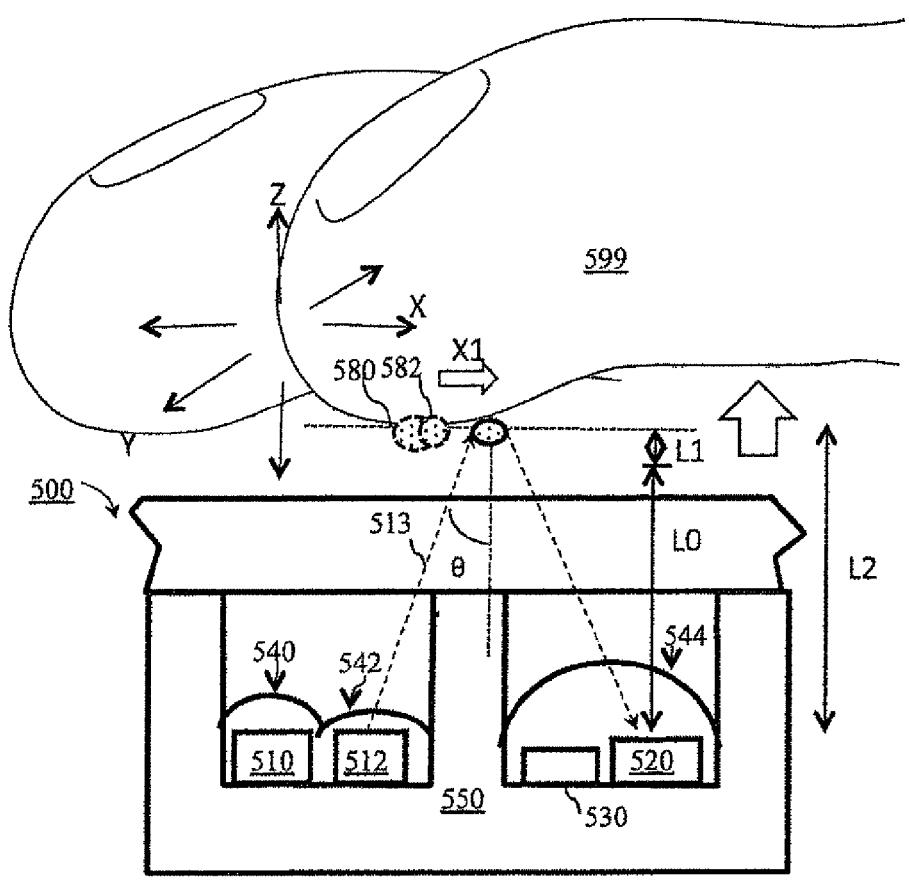
FIG. 5C illustrates a cross sectional view of an optical sensing device when the when the external object is in close proximity and substantially moves in a direction perpendicular to the optical sensing device.

FIGS. 5A-5C shows an optical sensing device 500 for detecting presence of an external object 599. Although a hand is used as illustration for the external object 599, the external object 599 may be anything, for example, a living thing, a non-living thing, or other body parts of a human being. The optical sensing device 500 may be a proximity sensor or other similar devices that have one of its functionalities to detect the presence of the external object 599. The optical sensing device 500 may comprise a detection light source 510, a displacement light source 512, a detection optical element 540, a displacement optical element 542, a sensor 520, a sensing optical element 544, a circuitry 530, and a body 550.

The detection, displacement and sensing optical elements 540, 542, 544 may be made from an encapsulant material encapsulating the detection and displacement light sources 510, 512 and the sensor 520 respectively. The encapsulant material may be silicone, epoxy or other material, which may be adapted to encapsulate the detection and displacement light sources 510, 512 and the sensor 520 when the encapsulant material is in liquid form during an early phase of the manufacturing process.

Referring to FIG. 5A, the detection light source 510 may be configured to emit a first radiation 511 and generate a first beam spot 580 on the external object 599 at the initial distance L0. The initial distance L0 may be defined as a distance when the optical sensing device 500 first detects the external object 599. The detection optical element 540 may be optically coupled with the detection light source 510. The detection optical element 540 may be configured to direct the first radiation 511 to the external object 599 such that the first radiation 511 may be reflected to the sensor 520 when the external object 599 is in proximity to the optical sensing device 500.

Referring to FIG. 5B, the displacement light source 512 may be configured to emit a second radiation 513 that forms a second beam spot 582 on the external object 599, so that the second beam spot 582 is relatively smaller than the first beam spot 580.

Referring to FIG. 5C, the displacement optical element 542 may be optically coupled with the displacement light source 512. By directing the second beam spot 582 at a displacement incident angle θ, the displacement optical element 542 may be configured to generate a shift X1 in the position of the second beam spot 582 when the external object 599 is in proximity and substantially moves in a direction perpendicular to the optical sensing device 500. In one embodiment, the shift X1 may be generated when the external object 599 is in proximity and is substantially displaced in a perpendicular direction relative to the optical sensing device 500. The displacement incident angle $\theta$ may be defined substantially similar with the incident angle α as discussed in the earlier paragraphs on FIG. 1B.

Referring to FIG. 5C, the sensor 520 may be configured to detect the shift X1 in the second beam spot 582 position when the external object 599 moves from an initial distance L0 to a displacement distance L2 in a perpendicular direction to the optical sensing device 500. The L2 may be equal to the initial distance L0 plus the displacement L1. The shift X1 in the second beam spot 582 position may correspond to the displacement L1 of the optical sensing device 500 in a direction perpendicular to the external object 599. The circuitry 530 may be configured to generate a displacement value L1 corresponding to the displacement of the optical sensing device 500 in a direction perpendicular to the external object 599 by sensing the shift X1 in the position of the second beam spot 582.

Figure 6:
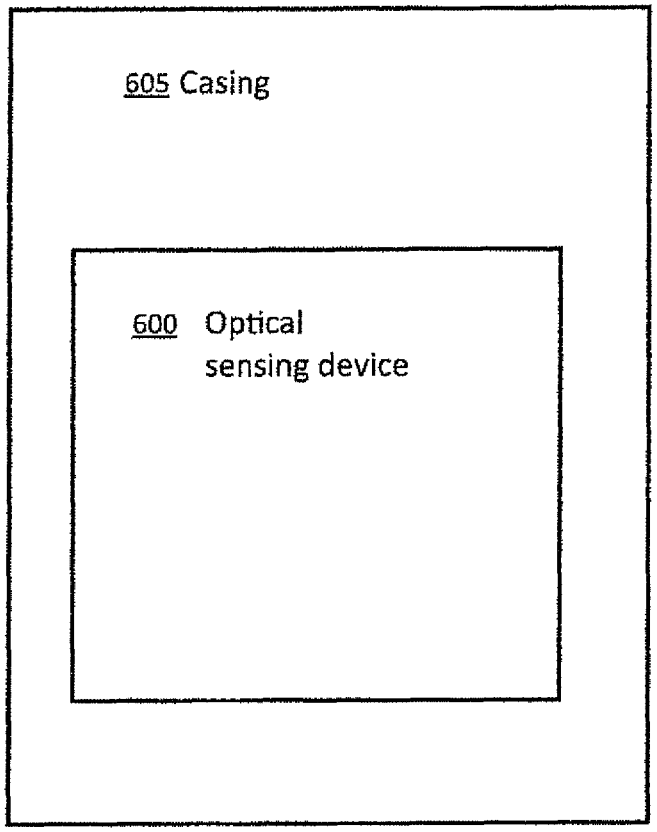
FIG. 6 illustrates a block diagram of an electronic hand held device.

FIG. 6 shows a block diagram of an electronic hand held device 601. The electronic hand held device 601 may be a mobile phone, a tablet computer, an optical navigation device or any other similar devices. The electronic hand held device 601 may comprise a casing 605 and an optical sensing device 600. The optical sensing device 600 may be disposed within the casing 605. The optical sensing device 600 may have some or all of the characteristics of the optical sensing device 500 illustrated in FIGS. 5A-5C or the optical sensing device 100 illustrated in FIGS. 1A-1J or the combination of features in both optical sensing devices 500, 100.

Different aspects, embodiments or implementations may, but need not, yield one or more of the advantages. For example, the utilization of two light sources may enable the optical sensing device to capture the second image that is distinct from the first image. The two light sources may also be activated alternately such that the optical sensing device may capture and analyze the first and second images with reduced distortion. This may provide for the optical sensing device generating a substantially accurate displacement value, without substantially compromising tracking accuracy in a parallel direction.

Further advantages may flow from the second beam spot being smaller than the first beam spot (and/or from the second image being smaller than the first image.) This may provide for a substantially shorter analog to digital conversion time for the second image relative to an analog to digital conversion time for the first image. For example, there may be analog to digital conversion time of approximately 200 microseconds or less for the first image, and a relatively shorter analog to digital conversion time, for example approximately 60 microsecond or less, for the second image. The shorter analog to digital conversion time of the second image may provide for an enhanced (e.g. more frequent) displacement monitoring by the circuitry. This may provide for frequent displacement monitoring by the circuitry, without substantially compromising time that may be needed by the circuitry to analyze the first image for tracking in a parallel direction. Additionally, upon conversion, there may be a substantially smaller range of pixel values associated with the second image, relative to range of pixel values associated with the first image. Accordingly, there may be a first pixel value range for the first image, for example first range of approximately 256 pixel values or less for the first image, and a relatively smaller second pixel value range for the second image, for example second range of approximately 2 pixel values for the second image. In other words, the first image may be converted to a first set of pixel values that may range from 0 to 255, which may then be analyzed by the processor. On the other hand, the second image may be converted to a second set of second pixel values that may range among two pixel values, for example 0 and 1 (e.g. the binary image), which may then be analyzed by the processor. Since the smaller range of pixel values of the second image may be processed by the circuitry for determining displacement, the smaller range of pixel values of the second image may provide for faster displacement processing time, without substantially compromising processing time that may be needed by the circuitry to determine tracking in the parallel direction from the first image.

Although specific embodiments of the invention have been described and illustrated herein above, the invention should not be limited to any specific forms or arrangements of parts so described and illustrated. For example, the light source described above may be a light emitting diode or laser or some other future light source as known or later developed without departing from the spirit of the invention. Similarly, although certain orientation terms such as "bottom", "disposed within", "outside" were used, the scope should not be limited to such orientation. The scope of the invention is to be defined by the claims.

What is claimed is:

1. An optical sensing device for sensing a proximate surface, the optical sensing device comprising:
a tracking light source configured to generate a first beam spot on the proximate surface;
a displacement light source configured to generate a second beam spot on the proximate surface, such that the second beam spot is relatively smaller than the first beam spot;
a sensor configured to capture a first image of the proximate surface when the first beam spot is generated, and configured to capture a second image of the proximate surface when the second beam spot is generated; and
a circuitry configured to convert the second image into a binary image, wherein the binary image comprises pixels that have one of two distinct pixel values assigned thereto;
wherein the circuitry is configured to generate a displacement value corresponding to the displacement of the optical sensing device in a direction perpendicular to the proximate surface based on the binary image.

2. The optical sensing device of claim 1, wherein:
the circuitry is configured to track the optical sensing device movement in a parallel direction relative to the proximate surface by analyzing the first image; and
the sensor is configured to capture the second image when the circuitry is analyzing the first image.

3. The optical sensing device of claim 2, wherein the displacement light source is configured to generate the second beam spot when the circuitry is analyzing the first image.

4. The optical sensing device of claim 2, wherein the circuitry is configured to generate the displacement value by analyzing the second image when the circuitry is analyzing the first image.

5. The optical sensing device of claim 1, wherein:
the sensor is configured to capture the first image within a first exposure time; and
the circuitry is configured to use a threshold value according to the first exposure time to convert the second image into the binary image.

6. The optical sensing device of claim 1, wherein:
the circuitry is configured to determine a boundary line of the second beam spot based on the binary image, wherein a shift in a position of the boundary line corresponds to the displacement of the optical sensing device in the direction perpendicular to the proximate surface; and
the circuitry is configured to generate the displacement value based on the shift in the position of the boundary line.

7. The optical sensing device of claim 1, further comprising a displacement optical element optically coupled with the displacement light source and configured to generate the second beam spot at a displacement incident angle such that the second beam spot shifts when the optical sensing device is displaced relative to the proximate surface, wherein:
the displacement optical element is configured to position the second beam spot such that the second image shows a substantially circular shape representative of the second beam spot when there is an initial displacement of the optical sensing device in the direction perpendicular to the proximate surface; and the displacement optical element is further configured to position the second beam spot such that the second image shows a substantially semi-circular shape representative of a portion of the second beam spot when the optical sensing device is displaced relative to the proximate surface further than the initial displacement.

8. The optical sensing device of claim 1, wherein the optical sensing device is a portion of an optical mouse.

9. The optical sensing device of claim 1, wherein the first beam spot generated by the tracking light source is approximately at least 60% larger than the second beam spot.

10. A method for detecting displacement of an optical sensing device relative to a proximate surface, the method comprising:

generating a first beam spot on a first location of the proximate surface with a tracking light source;

generating a second beam spot on the proximate surface that substantially overlaps with the first location with a displacement light source wherein the second beam spot is relatively smaller than the first beam spot;

directing the second beam spot at an incident angle;

shifting a position of the second beam spot when the optical sensing device is displaced relative to the proximate surface;

capturing an image of the second beam spot with a sensor; and converting the image to a binary image with a circuitry.

11. The method of claim 10, further comprising:

identifying a boundary line within the binary image with the circuitry, wherein shifting the position of the boundary line corresponds to shifting the position of the second beam spot; and generating a displacement value of the optical sensing device in a direction perpendicular to the proximate surface based on shifting the position of the boundary line.

12. A navigation device for tracking movement on a proximate surface, comprising:

a tracking light source configured to generate a first beam spot on a first location of the proximate surface;

a sensor configured to capture a first image of the proximate surface, the first image being generated during a first exposure time;

a circuitry configured to track movements of the navigation device relative to the proximate surface by processing the first image, wherein the processing of the first image starts at a first timing and ends at a second timing; and a displacement light source configured to generate a second beam spot on the proximate surface that substantially overlaps with the first location, wherein the sensor is configured to capture a second image of the proximate surface;

wherein the second beam spot is generated between the first timing and the second timing when the processing of the first image takes place;

wherein the circuitry is further configured to process the second image so as to determine a movement of the navigation device in a direction substantially perpendicular to the proximate surface;

wherein the circuitry is configured to convert the second image into a binary image, wherein the binary image comprises pixels that have one of two distinct pixel values assigned thereto.

13. The navigation device of claim 12, wherein the circuitry is configured to determine the movement in the direction substantially perpendicular to the proximate surface by processing the binary image.

14. The navigation device of claim 12, wherein the circuitry is configured to generate a displacement value corresponding to a displacement of the navigation device in the direction perpendicular to the proximate surface based on the binary image.

15. The navigation device of claim 12, wherein the circuitry is configured to determine a boundary line of the second beam spot based on the binary image.

16. The navigation device of claim 15, wherein the circuitry is configured to generate a displacement value based on a shift in a position of the boundary line of the second beam spot.

17. The navigation device of claim 12, wherein the circuitry is configured to convert the second image into the binary image based on a threshold value according to the first exposure time.

18. The navigation device of claim 12, wherein the circuitry is configured to process the second image at a shorter duration compared to a period measuring from the first timing to the second timing.

* * * * *